(12) United States Patent
Tsumagari et al.

(10) Patent No.: US 9,416,705 B2
(45) Date of Patent: Aug. 16, 2016

(54) BURNER AND FILTER RENEWAL DEVICE

(71) Applicants: HINO MOTORS, LTD., Tokyo (JP); SANGO CO., LTD., Aichi-ken (JP)

(72) Inventors: Ichiro Tsumagari, Hino (JP); Ryo Shibuya, Hino (JP); Atsushi Koide, Miyoshi (JP)

(73) Assignee: HINO MOTORS, LTD., Tokyo (JP)

( * ) Notice: Subject to any disclaimer, the term of this patent is extended or adjusted under 35 U.S.C. 154(b) by 0 days.

(21) Appl. No.: 14/395,892

(22) PCT Filed: Apr. 24, 2013

(86) PCT No.: PCT/JP2013/062107
§ 371 (c)(1),
(2) Date: Oct. 21, 2014

(87) PCT Pub. No.: WO2013/161897
PCT Pub. Date: Oct. 31, 2013

(65) Prior Publication Data
US 2015/0121857 A1    May 7, 2015

(30) Foreign Application Priority Data
Apr. 27, 2012    (JP) .................................. 2012-102957

(51) Int. Cl.
*F01N 3/10* (2006.01)
*F01N 3/025* (2006.01)
(Continued)

(52) U.S. Cl.
CPC .............. *F01N 3/0256* (2013.01); *F01N 3/025* (2013.01); *F01N 3/306* (2013.01); *F01N 5/02* (2013.01); *F23D 11/44* (2013.01); *B01D 46/0063* (2013.01); *F01N 2240/02* (2013.01); *F01N 2240/20* (2013.01); *F01N 2260/08* (2013.01); *F02B 37/168* (2013.01); *Y02T 10/16* (2013.01)

(58) Field of Classification Search
USPC ........... 60/286, 289, 292, 293, 295, 297, 300, 60/303, 311
See application file for complete search history.

(56) References Cited

U.S. PATENT DOCUMENTS 3,603,080 A * 9/1971 McCrocklin .............. F01N 3/26
422/168
4,383,411 A * 5/1983 Riddel .................. F01N 3/0256
60/303

(Continued)

FOREIGN PATENT DOCUMENTS

JP    S58-093676    6/1983
JP    60-19715 U    2/1985

(Continued)

OTHER PUBLICATIONS

International Search Report prepared by the Japanese Patent Office on May 27, 2013, for International Application No. PCT/JP2013/062107.

(Continued)

*Primary Examiner* — Binh Q Tran
(74) *Attorney, Agent, or Firm* — Sheridan Ross P.C.

(57) ABSTRACT

This burner has: a flame stabilizer formed in a tubular shape; a fuel supply unit that supplies fuel within the flame stabilizer; an air supply passage that includes a heater unit for heating air and that supplies air heated by the heater unit into the flame stabilizer; and an ignition unit that ignites the air-fuel mixture of combustion air and fuel within the flame stabilizer.

11 Claims, 5 Drawing Sheets

(51) Int. Cl.
  *F23D 11/44* (2006.01)
  *F01N 3/30* (2006.01)
  *F01N 5/02* (2006.01)
  *F02B 37/16* (2006.01)
  *B01D 46/00* (2006.01)

(56) References Cited

U.S. PATENT DOCUMENTS

| | | | |
|---|---|---|---|
| 4,789,331 A | 12/1988 | Kawamura | |
| 4,858,432 A | 8/1989 | Knauer et al. | |
| 4,987,738 A * | 1/1991 | Lopez-Crevillen | F01N 3/025 60/286 |
| 5,320,523 A * | 6/1994 | Stark | F01N 3/2033 431/158 |
| 5,339,630 A * | 8/1994 | Pettit | F01N 3/2033 431/354 |
| 5,826,428 A * | 10/1998 | Blaschke | F01N 3/025 60/303 |
| 8,959,902 B2 * | 2/2015 | Olivier | F01N 3/2033 60/295 |
| 2008/0276600 A1 | 11/2008 | Lee et al. | |
| 2009/0031703 A1 | 2/2009 | Lee et al. | |
| 2010/0003757 A1 | 1/2010 | Mack et al. | |
| 2010/0008831 A1 | 1/2010 | Lee et al. | |
| 2010/0158868 A1 | 6/2010 | Kan | |

FOREIGN PATENT DOCUMENTS

| | | |
|---|---|---|
| JP | 1-114607 A | 5/1989 |
| JP | 2000-282842 A | 10/2000 |
| JP | 2001-099404 | 4/2001 |
| JP | 2007-146700 | 6/2007 |
| JP | 2009-20608 A | 2/2009 |
| JP | 2009-30608 A | 2/2009 |
| JP | 2009-511247 A | 3/2009 |
| JP | 2009-512810 | 3/2009 |
| JP | 2011-185493 A | 9/2011 |
| WO | WO03/050249 A2 | 6/2003 |
| WO | WO 2007/043783 | 4/2007 |
| WO | WO2008/016225 | 2/2008 |

OTHER PUBLICATIONS

Zhang et al. "A Human iPSC Model of Hutchinson Gilford Progeria Reveals Vascular Smooth Muscle and Mesenchymal Stem Cell Defects." Cell Stem Cell 8, 31-45, Jan. 7, 2011.

Segev et al. "Differentiation of Human Embryonic Stem Cells into Insulin-Producing Clusters", Stem Cells, 2004; 22: 265-274.

Zhao, et al. "Two Supporting Factors Greatly Improve the Efficiency of Human iPSC Generation", Cell Stem Cell 3, Nov. 6, 2008, 475-479.

International Preliminary Report on Patentability for International (PCT) Patent Application No. PCT/JP2013/062107, dated Oct. 28, 2014, 7 pages.

Extended Search Repport for European Patent Application No. 13781237.6, dated Feb. 2, 2016, 7 pages.

* cited by examiner

BURNER AND FILTER RENEWAL DEVICE

CROSS REFERENCE TO RELATED APPLICATIONS

This application is a national stage application under 35 U.S.C. 371 and claims the benefit of PCT Application No. PCT/JP2013/062107 having an international filing date of Apr. 24, 2013, which designated the United States, which PCT application claimed the benefit of Japanese Patent Application No. 2012-102957 filed Apr. 27, 2012, the disclosures of each of which incorporated herein by reference.

TECHNICAL FIELD

The technique of the present disclosure relates to a filter regeneration device that regenerates a particulate filter by raising the temperature of exhaust gas flowing into the particulate filter.

BACKGROUND ART

Conventional diesel engines include, in the exhaust passage, a diesel particulate filter (DPF), which captures particulate matter (PM) contained in exhaust gas. In such a DPF, in order to maintain the function of capturing particulate matter, a regeneration process, in which particulate matter captured by the DPF is burnt, is performed.

For example, Patent Document 1 discloses a filter regeneration device, in which a burner is arranged upstream of a DPF. Exhaust gas at the temperature raised by the burner is sent to the DPF to perform a regeneration process for the DPF. In the burner, fuel for the engine and air for combustion are introduced to a combustion area, which is a tubular inner space of a flame stabilizer, to produce mixture of the fuel and the air for combustion. The air-fuel mixture is then burnt by ignition to raise the temperature of the exhaust gas.

PRIOR ART DOCUMENT

Patent Document

Patent Document 1: Japanese Laid-Open Patent Publication No. 2011-185493

SUMMARY OF THE INVENTION

In the aforementioned filter regeneration device, fuel for the engine is used for raising the temperature of exhaust gas. Since the fuel is not used for power of the engine, in order to reduce the amount of fuel consumed by the vehicle including the engine, it is preferable that a small amount of fuel is used for raising the temperature of the exhaust gas. For this reason, to reduce the amount of fuel necessary for obtaining a certain level of burner output, it is desired to decrease the amount of unburned gas during combustion.

An objective of the technique of the present disclosure is to provide a burner that reduces fuel discharged as unburned gas and a filter regeneration device that reduces fuel discharged as unburned gas.

One aspect of the present disclosure is a burner including a tubular flame stabilizer, a fuel supply unit for supplying fuel to an inside of the flame stabilizer, an air supply passage, which includes a heating portion for heating air and supplies the air heated by the heating portion to the inside of the flame stabilizer, and an ignition unit for igniting air-fuel mixture of the fuel and the air in the flame stabilizer.

One aspect of the present disclosure is a filter regeneration device including a tubular flame stabilizer, a fuel supply unit for supplying fuel to an inside of the flame stabilizer, an air supply passage, which includes a heating portion for heating air and supplies the air heated by the heating portion to the inside of the flame stabilizer, and an ignition unit for igniting air-fuel mixture of the fuel and the air in the flame stabilizer.

According to the above configuration, air heated by the heating portion is supplied to the inside of the flame stabilizer. For this reason, compared to when air is not heated by the heating portion, the temperature of air introduced into the flame stabilizer is raised, and vaporization of the fuel is promoted by the raised temperature. This reduces fuel discharged as unburned gas after being supplied to the combustion area.

In the burner according to another aspect of the present disclosure, the air supply passage includes a wall portion, which forms a flow path through which the air flows. The heating portion includes the wall portion, and the wall portion heats the air with heat received from at least one of an exhaust passage of an engine and the flame stabilizer.

The flame stabilizer is usually heated by the preceding combustion of air-fuel mixture, and the exhaust passage is heated with the exhaust gas itself. In the burner according to this aspect of the present disclosure, the wall portion of the air supply passage is heated with waste heat of at least one of the flame stabilizer and the exhaust passage.

In the burner according to another aspect of the present disclosure, the wall portion includes a fin, which contacts the air.

In the burner according to this aspect of the present disclosure, the wall portion of the air supply passage includes the fin. Thus, heat is efficiently transferred between the air and at least one of the flame stabilizer and the exhaust passage. As a result, compared to when the wall portion of the air supply passage does not include the fin, the temperature of air introduced to the combustion area is raised so that vaporization of the fuel is further promoted.

In the burner according to another aspect of the present disclosure, the flame stabilizer includes a circumferential wall, which forms a combustion area in which the air-fuel mixture is combusted, and the wall portion includes the circumferential wall.

In the burner according to this aspect of the present disclosure, the circumferential wall, which constitutes the flame stabilizer, provides the function of the heating portion. For this reason, compared to when the heating portion, which utilizes heat of the circumferential wall, and the circumferential wall are discretely provided, the burner can be configured in a simple manner.

In the burner according to another aspect of the present disclosure, the air supply passage includes an outer tube, which surrounds the circumferential wall. The circumferential wall includes a communication hole through which the flow path between the outer tube and the circumferential wall communicates with the combustion area. The air supply passage supplies the air introduced to the flow path to the combustion area through the communication hole.

In the burner according to this aspect of the present disclosure, the air is heated immediately before flowing into the combustion area. The decrease in the temperature of the air after being heated before flowing into the combustion area is limited.

In the burner according to another aspect of the present disclosure, the flame stabilizer has a distal end from which the flame projects, and the air is introduced to the air supply passage from a portion of the air supply passage that is located closer to the distal end than the communication hole.

In the burner according to this aspect of the present disclosure, air flows in the gap between the flame stabilizer and the outer tube from the distal side of the flame stabilizer toward the communication hole. For this reason, the air flowing into the gap does not easily stay there. Thus, compared to when the air flow is not formed, the air is effectively heated in the gap between the flame stabilizer and the outer tube.

In accordance with another aspect of the present disclosure, the burner further includes a premixing chamber, which is arranged in the flame stabilizer and produces the air-fuel mixture. The air supply passage supplies the air to the premixing chamber.

In the burner according to this aspect of the present disclosure, the air-fuel mixture to be combusted is mixed in advance in the premixing chamber. For this reason, compared to when production of the air-fuel mixture and combustion of the air-fuel mixture take place in the same space, the air-fuel mixture is easily ignited and efficiently combusted. This further reduces fuel discharged as unburned gas.

In the filter regeneration device according to another aspect of the present disclosure, the air supply passage includes a wall portion, which forms a flow path through which the air flows. The heating portion includes the wall portion, and the wall portion heats the air with heat received from the exhaust passage of the engine.

In the filter regeneration device according to this aspect of the present disclosure, the air is heated with waste heat of the exhaust gas flowing in the exhaust passage.

DETAILED DESCRIPTION OF THE PREFERRED EMBODIMENTS

First Embodiment

A filter regeneration device according to a first embodiment of the present disclosure will now be described with reference to FIGS. 1 to 3. First, the general structure of a diesel engine including the filter regeneration device will be described with reference to FIG. 1. A passage of air drawn into the diesel engine and a passage of exhaust gas discharged from the diesel engine will primarily be described here.

Figure 1:
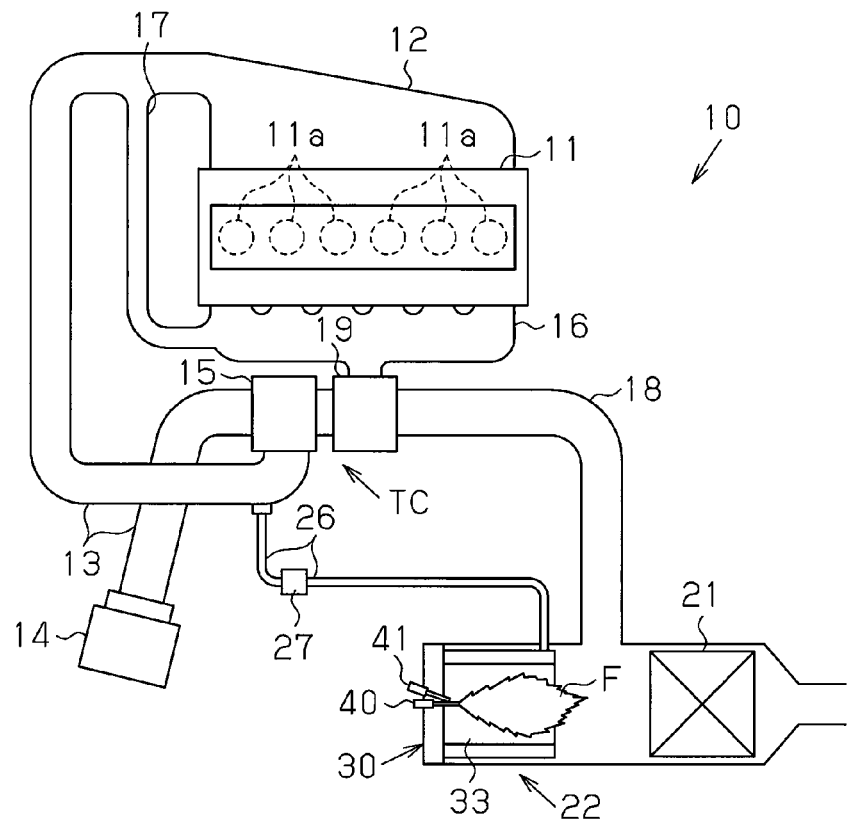
FIG. 1 is a schematic view of a diesel engine including a filter regeneration device according to a first embodiment of the technique of the present disclosure.

As shown in FIG. 1, a cylinder block 11 of a diesel engine 10 includes six cylinders 11a arranged in line and is connected to an intake manifold 12 for supplying intake air to the cylinders 11a and an exhaust manifold 16, into which exhaust gas flows from the cylinders 11a.

An intake pipe 13, which is a passage of intake air, is attached to the intake manifold 12. An air cleaner 14 is attached to the upstream end of the intake pipe 13. The compressor 15 of a turbocharger TC is attached to a portion of the intake pipe 13. The exhaust manifold 16 is connected to an exhaust pipe 18, which constitutes an exhaust passage, and is connected to an EGR pipe 17, which delivers exhaust gas into the intake pipe 13 by connecting the intake pipe 13 and the exhaust manifold 16. An upstream portion of the exhaust pipe 18 is connected to a turbine 19 coupled to the compressor 15.

A downstream portion of the exhaust pipe 18 includes a diesel particulate filter 21 (hereinafter, referred to as a DPF 21), which captures particulate matter contained in exhaust gas. The DPF 21 has a honeycomb structure made of, e.g., porous silicon carbide and captures particulate matter in the exhaust gas with pillar-like inner wall surfaces, which constitute the honeycomb structure. An upstream portion of the DPF 21 includes a filter regeneration device 22, which carries out a regeneration process of the DPF 21 by raising the temperature of the exhaust gas flowing into the DPF 21.

The filter regeneration device 22 will now be described with reference to FIGS. 1 and 2. As shown in FIG. 1, the filter regeneration device 22 has a burner 30 arranged upstream of the DPF 21 and a connection passage 26, which is a pipe that is connected to a portion of the intake pipe 13 located downstream of the compressor 15 and supplies air to a combustion area 33 of the burner 30. A portion of the connection passage 26 is attached to an air valve 27. When the air valve 27 is in an open state, some of the intake air in the intake pipe 13 is supplied to the combustion area 33 as air for combustion.

Figure 2:
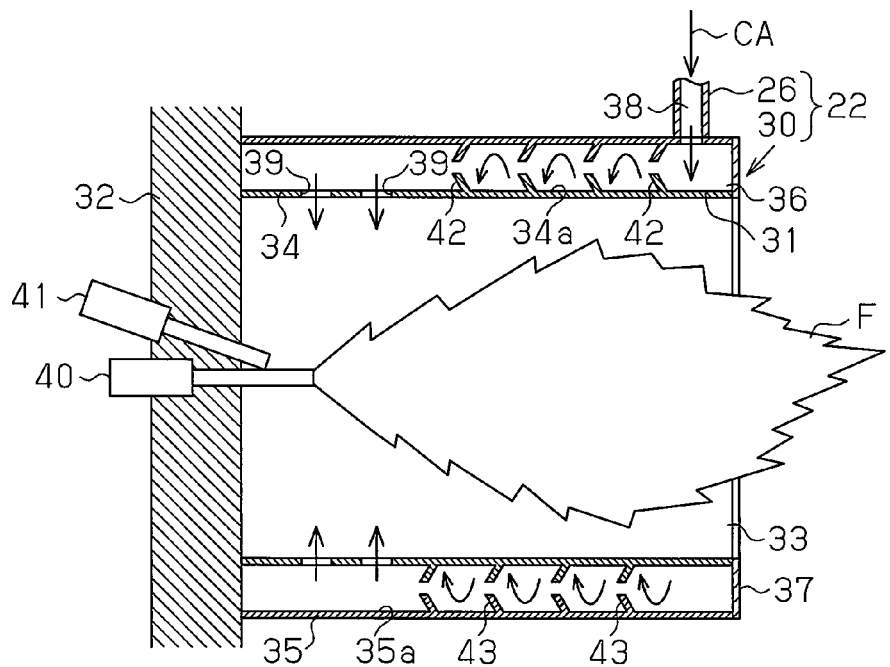
FIG. 2 is a schematic view of a burner according to the first embodiment.

As shown in FIG. 2, a flame stabilizer 31 of the burner 30 has a cylindrical tube shape with a bottom. A basal wall 32 as the bottom is coupled to an inner tube 34, which is a circumferential wall of the flame stabilizer 31. The space inside the inner tube 34 serves as the combustion area 33. An outer tube 35, which has a cylindrical tube shape surrounding an outer circumferential face 34a of the inner tube 34, is fixed to the basal wall 32 of the flame stabilizer 31. The outer circumferential face 34a of the inner tube 34 and an inner circumferential face 35a of the outer tube 35 constitute an introduction flow path 36. The inner tube 34 and the outer tube 35 constitute an air supply passage of the burner 30. Specifically, the inner tube 34 is a wall portion that forms the combustion area 33, in which flame F is produced, and an introduction flow path 36, through which air for combustion CA flows. The inner tube 34 is a heating portion that heats the air for combustion CA flowing through the introduction flow path 36. An annular closing wall 37 closes the introduction flow path 36 at the distal side of the flame stabilizer 31. The flame F projects from the distal end of the flame stabilizer 31.

The connection passage 26 is connected to an upper portion of the outer tube 35 at the distal side. A flow path 38 of the connection passage 26 communicates with the introduction flow path 36. The inner tube 34 includes communication holes 39 formed at the basal side over the entire circumference so that the introduction flow path 36 communicates with the combustion area 33. Specifically, when the air valve 27 is in the open state, some of the intake air of the intake pipe 13 is supplied as air for combustion CA to the combustion area 33 through the flow path 38 of the connection passage 26, the introduction flow path 36, and the communication holes 39.

A fuel supply unit 40 of the burner 30 is a known fuel injection valve and is fixed to the basal wall 32 such that an injection port is arranged in the combustion area 33. Fuel is injected toward the combustion area 33 so that the fuel mist is supplied to the combustion area 33. The fuel supply unit 40 is connected to a fuel pump (not shown) for supplying fuel to the cylinders 11a. The fuel supply unit 40 injects the fuel, e.g., at a pressure between 0.5 MPa and 4 MPa inclusive, preferably, 1 MPa or less. The fuel supply unit 40 is controlled such that the fuel injection amount per unit time changes depending on the temperature of the DPF 21, the flow rate of exhaust gas in the exhaust pipe 18, the amount of intake air in the intake pipe 13, and the like.

An ignition unit 41 of the burner 30 is a known spark plug, and ignites mixture of fuel supplied from the fuel supply unit 40 and air for combustion CA by generating sparks in the combustion area 33. This produces flame F in the combustion area 33.

The inner tube 34 includes a plurality of fins 42 on the outer circumferential face 34a. The fins 42 are arranged in a helical manner from the distal side of the inner tube 34 to the basal side. The outer tube 35 also includes a plurality of fins 43 on the inner circumferential face 35a. The fins 43 of the outer tube 35 are arranged in a helical manner from the distal side of the outer tube 35 to the basal side to face to the fins 42 of the inner tube 34 in the radial direction of the inner tube 34. The air for combustion CA flowing through the introduction flow path 36 is guided by the fins 42 and 43 to flow toward the communication holes 39 while swirling around the inner tube 34.

Operation of the filter regeneration device 22 configured as above will now be described. When the regeneration process of the DPF 21 is started, the air valve 27 is opened, and the fuel supply unit 40 and the ignition unit 41 are driven. When the air valve 27 is opened, some of the intake air flowing in the intake pipe 13 flows into the combustion area 33 as air for combustion through the flow path 38 of the connection passage 26, the introduction flow path 36, and the communication holes 39. In the combustion area 33, mixture of the air for combustion and the fuel supplied by the fuel supply unit 40 is produced, and flame F is produced by ignition of the ignition unit 41. When the flame F is produced, the flame F raises the temperature of exhaust gas flowing into the DPF 21. The exhaust gas at the raised temperature flows into the DPF 21 to burn particulate matter captured by the DPF 21.

In this case, the air for combustion that has passed the introduction flow path 36 is supplied to the combustion area 33. The inner tube 34, which constitutes the introduction flow path 36, is heated by the flame F produced in the combustion area 33. Specifically, the air for combustion flowing into the combustion area 33 is heated by the flame F produced in advance via the inner tube 34.

Due to the heating, the combustion area 33 is supplied with the air for combustion at a higher temperature than when the air for combustion is not heated. As a result, vaporization of fuel in the air-fuel mixture is promoted by the increase in the temperature of the air for combustion, and unburned gas in the flame F is reduced. In the burner 30 according to the present disclosure, some of the heat of the flame F is absorbed by the air for combustion, while unburned gas is reduced. Under the assumption that the same amount of fuel is supplied to the combustion area 33 when air for combustion is heated and when the air for combustion is not heated, the burner 30 can maintain the output to be more than or equivalent to the output when the air for combustion is not heated.

Here, the connection passage 26 is connected to a distal end portion of the outer tube 35, and the inner tube 34 includes the communication holes 39 at the basal side so that the introduction flow path 36 communicates with the combustion area 33. The inner tube 34 and the outer tube 35 include the fins 42 and the fins 43 for guiding air for combustion such that the air for combustion flowing through the introduction flow path 36 flows while swirling around the inner tube 34. Thus, compared to when the fins 42 and 43 are not formed, the air for combustion takes a longer route to reach the communication holes 39, and the outer surface area of the inner tube 34 is enlarged by the areas of the fins 42. Specifically, due to the formed fins 42 and 43, heat is efficiently transferred between the air for combustion and the flame F via the inner tube 34. Thus, the temperature of the air for combustion flowing into the combustion area 33 can be raised higher. As a result, vaporization of the fuel is further promoted, and unburned gas in the flame F is further reduced.

Furthermore, the air for combustion is heated while flowing through the introduction flow path 36, which is formed by the inner tube 34 including the combustion area 33 and the outer tube 35 surrounding the inner tube 34. Specifically, immediately before being introduced to the combustion area 33, the air for combustion is heated in the introduction flow path 36. This limits the decrease in the temperature of the air for combustion after being heated before flowing into the combustion area 33, and waste heat of the flame F is effectively utilized.

Figure 3:
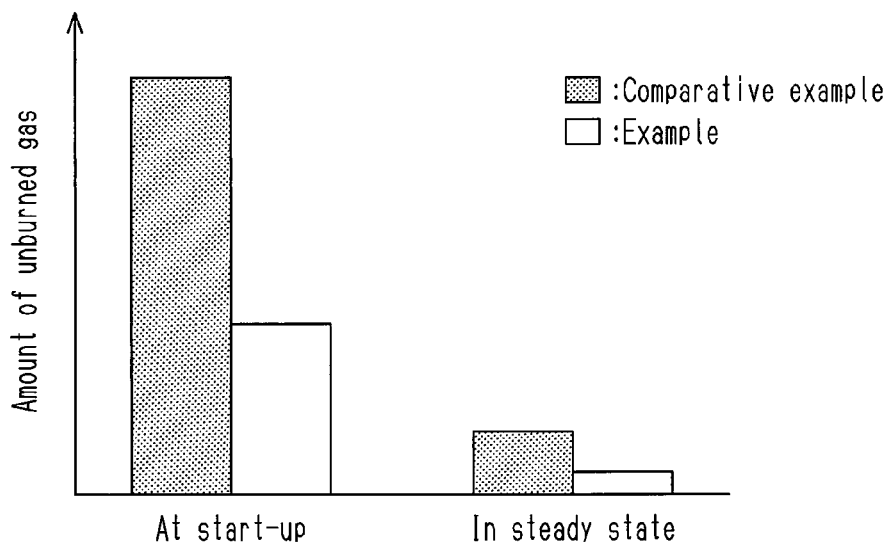
FIG. 3 is a bar chart that shows an amount of unburned gas flowing into a DPF in an example according to the first embodiment.

FIG. 3 is a bar chart that shows the amount of unburned gas in exhaust gas flowing into the DPF 21 in an example relative to the amount of unburned gas in a comparative example. In the comparative example, the air for combustion is not heated. In the example, the air for combustion is heated using the filter regeneration device 22 configured as above. As shown in FIG. 3, since the temperature of the flame stabilizer 31 is substantially equal to the ambient temperature at start-up of the engine, there is a relatively large amount of unburned gas compared to the amount in the steady state. However, in both states of the engine, at the start-up and in the steady state, it was observed that the unburned gas was reduced by heating the air for combustion.

As described above, the filter regeneration device 22 according to the first embodiment provides the following effects (advantages).

(1) The air for combustion flowing into the combustion area 33 is heated to have the temperature raised. This promotes vaporization of fuel in the air-fuel mixture compared to when the air for combustion is not heated. As a result, the air-fuel mixture is efficiently combusted, and unburned gas flowing into the DPF 21 is reduced.

(2) Since unburned gas is reduced, a less amount of fuel is needed for obtaining the burner output equivalent to the output when the air for combustion is not heated. As a result, it is possible to reduce the size of the burner 30.

(3) The air for combustion is heated with the inner tube 34, which constitutes the combustion area 33 and the introduction flow path 36. Thus, the configuration for heating air for combustion is simplified compared to when the configuration for heating air for combustion is separately provided such as a burner for heating air for combustion.

(4) Since the inner tube 34 includes the fins 42 on the outer circumferential face 34a, heat is efficiently transferred between air for combustion and flame F via the inner tube 34.

(5) Since the fins 42 are arranged in a helical manner, air for combustion flows toward the communication holes 39 through the introduction flow path 36 while swirling around the inner tube 34. This lengthens the route of the air for combustion to reach the communication holes 39.

(6) With the effects (4) and (5), the temperature of air for combustion flowing into the combustion area 33 is raised compared to when the inner tube 34 does not include the fins 42. This further promotes vaporization of fuel in the combustion area 33.

(7) The flow of the air for combustion that travels from the distal side of the flame stabilizer 31 to the basal side is formed on the introduction flow path 36. For this reason, the air for combustion flowing into the introduction flow path 36 does not easily stay in the introduction flow path 36. Thus, air is effectively heated in the introduction flow path 36 compared to when such a flow of air for combustion is not formed.

(8) Air for combustion is heated in the introduction flow path 36, which the air for combustion passes immediately before flowing into the combustion area 33. This limits the decrease in the temperature of the air for combustion after being heated before flowing into the combustion area 33.

Second Embodiment

A filter regeneration device according to a second embodiment of the present disclosure will now be described with reference to FIGS. 4 to 6. The filter regeneration device according to the second embodiment is primarily configured in the same way as the filter regeneration device according to the first embodiment. Thus, in the second embodiment, parts different from the first embodiment will be described in detail, and parts similar to the first embodiment will not be described in detail by assigning like reference characters.

Figure 4:
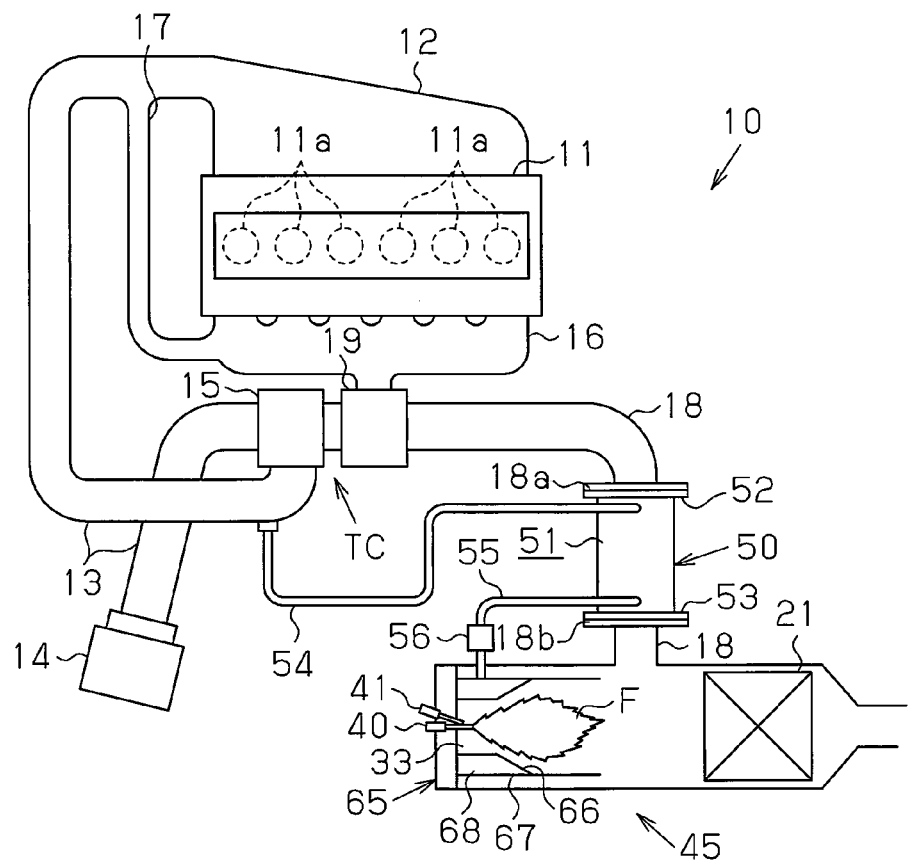
FIG. 4 is a schematic view of a diesel engine including a filter regeneration device according to a second embodiment of the technique of the present disclosure.

As shown in FIG. 4, a filter regeneration device 45 according to the second embodiment includes an air supply portion 50 for supplying air for combustion to a burner 65. The air supply portion 50 constitutes an air supply passage in the filter regeneration device and includes a double tube portion 51 arranged in a portion of the exhaust pipe 18. The double tube portion 51 is arranged downstream of the turbine 19. The double tube portion 51 includes flanges 52 and 53 at the top and bottom, respectively. The flanges 52 and 53 are coupled to flanges 18a and 18b of the exhaust pipe 18, respectively, via a gasket. A top portion of the double tube portion 51 is connected to an inflow passage 54, which is a pipe communicating with the portion of the intake pipe 13 that is located downstream of the compressor 15. A bottom portion of the double tube portion 51 is connected to an outflow passage 55, which is a pipe communicating with the combustion area 33. An air valve 56 is attached to a portion of the outflow passage 55.

The burner 65 according to the second embodiment includes a tubular flame stabilizer 66 having a broadened distal portion. A basal portion of the flame stabilizer 66 is coupled to a closing plate 67 to surround a small diameter portion of the flame stabilizer 66. An introduction portion 68 is formed by the space surrounded by the flame stabilizer 66 and the closing plate 67. After flowing into the introduction portion 68, air for combustion of the outflow passage 55 is introduced to the combustion area 33 through communication holes (not shown) formed in the small diameter portion of the flame stabilizer 66.

Figure 5:
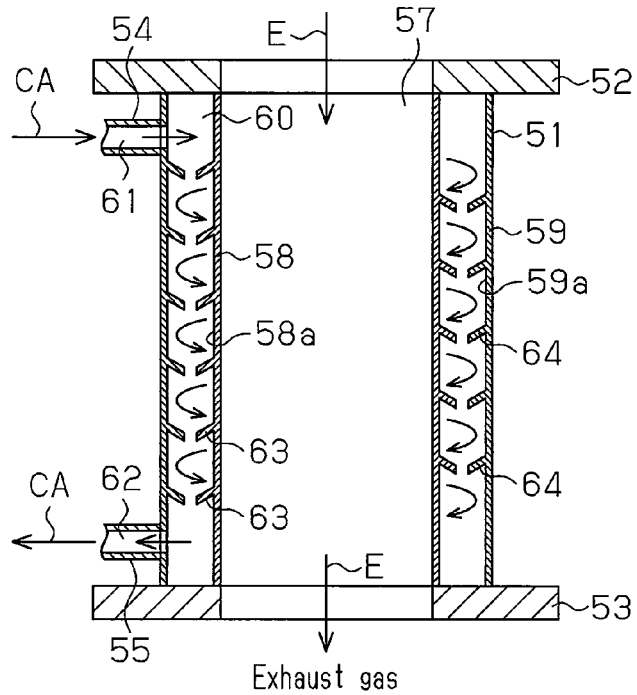
FIG. 5 is a schematic view of a double tube portion according to the second embodiment.

As shown in FIG. 5, the double tube portion 51 is a part of the exhaust pipe 18 and has an inner pipe 58 and an outer pipe 59. The inner pipe 58 forms an inner flow path 57, through which exhaust gas E from the cylinders 11a flows. The outer pipe 59 is arranged to surround the inner pipe 58. The double tube portion 51 includes an outer flow path 60 formed by an outer circumferential face 58a of the inner pipe 58 and an inner circumferential face 59a of the outer pipe 59. After flowing into the outer flow path 60 from a flow path 61 of the inflow passage 54, air for combustion CA flows out to a flow path 62 of the outflow passage 55. Specifically, the inner pipe 58 is a wall portion that forms the inner flow path 57, through which exhaust gas E flows, and the outer flow path 60, through which the air for combustion CA flows. The inner pipe 58 is a heating portion that heats the air for combustion CA flowing through the outer flow path 60.

The inner pipe 58 includes a plurality of fins 63 on the outer circumferential face 58a. The fins 63 are arranged in a helical manner from the top to the bottom of the inner pipe 58. The outer pipe 59 also includes a plurality of fins 64 on the inner circumferential face 59a. The fins 64 of the outer pipe 59 are arranged in a helical manner from the top to the bottom of the outer pipe 59 to face to the fins 63 of the inner pipe 58 in the radial direction of the inner pipe 58. The air for combustion CA flowing through the outer flow path 60 is guided by the fins 63 and 64 flows toward the outflow passage 55 while swirling around the inner pipe 58.

Operation of the filter regeneration device 45 will now be described. When the regeneration process of the DPF 21 is started, the air valve 56 is opened, and the fuel supply unit 40 and the ignition unit 41 are driven. When the air valve 56 is opened, some of the intake air flowing through the intake pipe 13 flows into the combustion area 33 as air for combustion through the flow path 61 of the inflow passage 54, the outer flow path 60, the flow path 62 of the outflow passage 55, and the introduction portion 68. Mixture of the air for combustion and fuel supplied by the fuel supply unit 40 is produced in the combustion area 33, and flame F is generated by ignition of the ignition unit 41. When the flame F is generated, the exhaust gas flowing into the DPF 21 has the temperature raised by the flame F to burn particulate matter captured by the DPF 21.

In this case, the combustion area 33 is supplied with the air for combustion that has passed the outer flow path 60. The inner pipe 58, which constitutes the outer flow path 60, is heated with the exhaust gas. Specifically, the air for combustion flowing into the combustion area 33 is heated with the exhaust gas flowing through the inner flow path 57 via the inner pipe 58.

Due to the heating, the combustion area 33 is supplied with the air for combustion at a higher temperature than when the air for combustion is not heated. As a result, vaporization of fuel in the air-fuel mixture is promoted by the increase in the temperature of the air for combustion, and unburned gas in the flame F is reduced. Thus, although heat of the exhaust gas is partially absorbed by the air for combustion, under the assumption that the same amount of fuel is supplied to the combustion area 33, the temperature of the exhaust gas flowing into the DPF 21 is raised at the same as or higher than when the air for combustion is not heated in the filter regeneration device 45.

The air for combustion is guided by the fins 63 of the inner pipe 58 and the fins 64 of the outer pipe 59 to flow through the outer flow path 60 while swirling around the inner pipe 58. This lengthens the route of the air for combustion to reach the outflow passage 55 and enlarges the outer surface area of the inner pipe 58 by the areas of the fins 63 compared to when the fins 63 and 64 are not formed. Specifically, due to the formed fins 63 and 64, heat is efficiently transferred between the air for combustion and the exhaust gas via the inner pipe 58. Thus, the temperature of air for combustion flowing into the combustion area 33 can be raised higher.

While the engine is stopped, when the inner pipe 58 and the outer pipe 59 are cooled down to a temperature substantially equal to the ambient temperature, the air staying in the outer flow path 60 is also cooled down so that water contained in the air is sometimes condensed. Then, if the condensed water flows into the air valve 56 through the outflow passage 55 and is frozen in the air valve 56, this could interfere with smooth driving of the air valve 56 upon the subsequent start of the engine.

In this regard, the outflow passage 55 including the air valve 56 is connected to a part of the outer flow path 60 that is located higher than a bottom surface. Thus, the condensed water on the outer flow path 60 is stored in the bottom portion of the outer flow path 60, and this restricts the condensed water from flowing into the outflow passage 55. As a result, there is a high probability that the air valve 56 will be driven upon the subsequent start of the engine.

Figure 6:
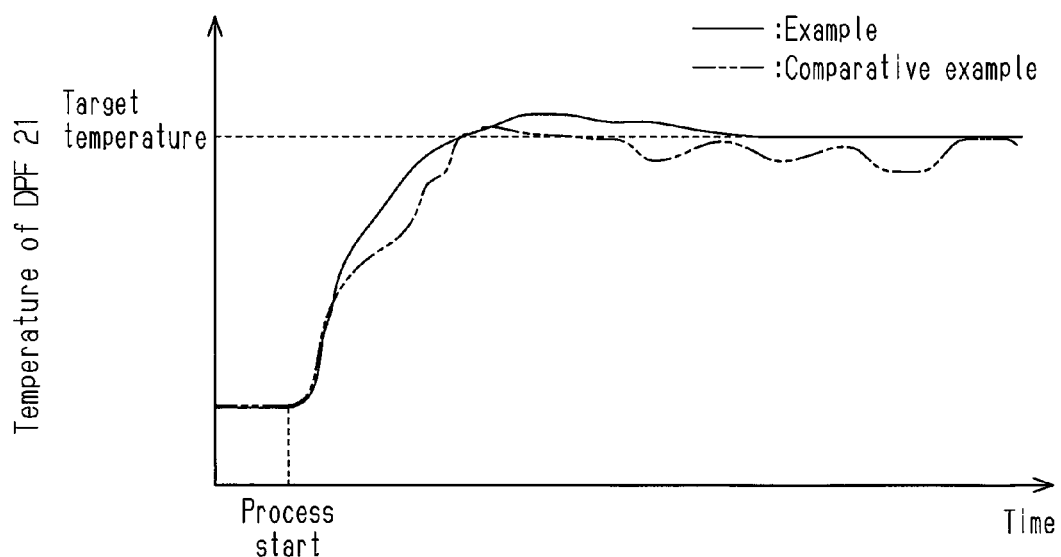
FIG. 6 is a graph that shows changes in the temperature of a DPF in a regeneration process in an example according to the second embodiment.

FIG. 6 is a graph that shows changes in the temperature of the DPF 21 in the regeneration process. In the graph, the solid line represents an example in which air for combustion is heated using the filter regeneration device 45 configured as above, and a long dashed double-short dashed line represents a comparison example in which the air for combustion is not heated. As shown in FIG. 6, it was observed that when the air for combustion was heated, the change in the temperature during being raised and the change in the temperature after reaching a target temperature were stable compared to when the air for combustion is not heated. This is thought to be due to the fact that the fuel supply amount of the fuel supply unit 40 was controlled depending on the temperature of the DPF 21, the flow rate of exhaust gas of the exhaust pipe 18, the intake air amount of the intake pipe 13, and the like, and the temperature of exhaust gas flowing into the DPF 21 was controlled to be a temperature corresponding to the fuel supply amount by reducing unburned gas.

As described above, the filter regeneration device 45 according to the second embodiment provides the following effects (advantages) in addition to the effects (1) and (2) described in the first embodiment.

(9) Air for combustion is heated with the inner pipe 58, which constitutes the inner flow path 57, through which exhaust gas flows, and the outer flow path 60, through which the air for combustion flows. For this reason, compared to when a configuration for heating air for combustion is separately provided as in a burner for heating air for combustion, the configuration for heating air for combustion is simplified.

(10) Since the inner pipe 58 includes the fins 63 on the outer circumferential face 58a, heat is efficiently transferred between air for combustion and exhaust gas via the inner pipe 58.

(11) Since the fins 63 are arranged in a helical manner, air for combustion flows through the outer flow path 60 while swirling around the inner pipe 58. This lengthens the route of the air for combustion to reach the outflow passage 55.

(12) With the effects (10) and (11), compared to when the inner pipe 58 does not include the fins 63, the temperature of air for combustion flowing into the combustion area 33 is raised. As a result, vaporization of fuel in the combustion area 33 is further promoted.

(13) Since the layer of air surrounding the inner pipe 58 is formed with the outer flow path 60, waste heat of exhaust gas released to the external space is reduced compared to when the outer flow path 60 is not formed. As a result, since the decrease in the temperature of the exhaust gas is limited, for example, the decrease in the temperature of a catalyst for purifying the exhaust gas is limited.

(14) The outflow passage 55 is connected to a part of the outer flow path 60 that is located higher than a bottom surface. Thus, even when condensation occurs on the outer flow path 60, there is a high probability that the air valve 56 will be driven upon the subsequent start of the engine.

Third Embodiment

A third embodiment of the filter regeneration device according to the present disclosure will now be described with reference to FIGS. 7 to 9. The filter regeneration device according to the third embodiment differs from the burner 30 according to the first embodiment mainly in the point that air-fuel mixture produced in a premixing chamber is supplied to a combustion area. Accordingly, in the third embodiment, different parts from the burner according to the first embodiment will be described in detail, and members with the similar functions to the burner 30 according to the first embodiment will not be described in detail by assigning like reference characters.

Figure 7:
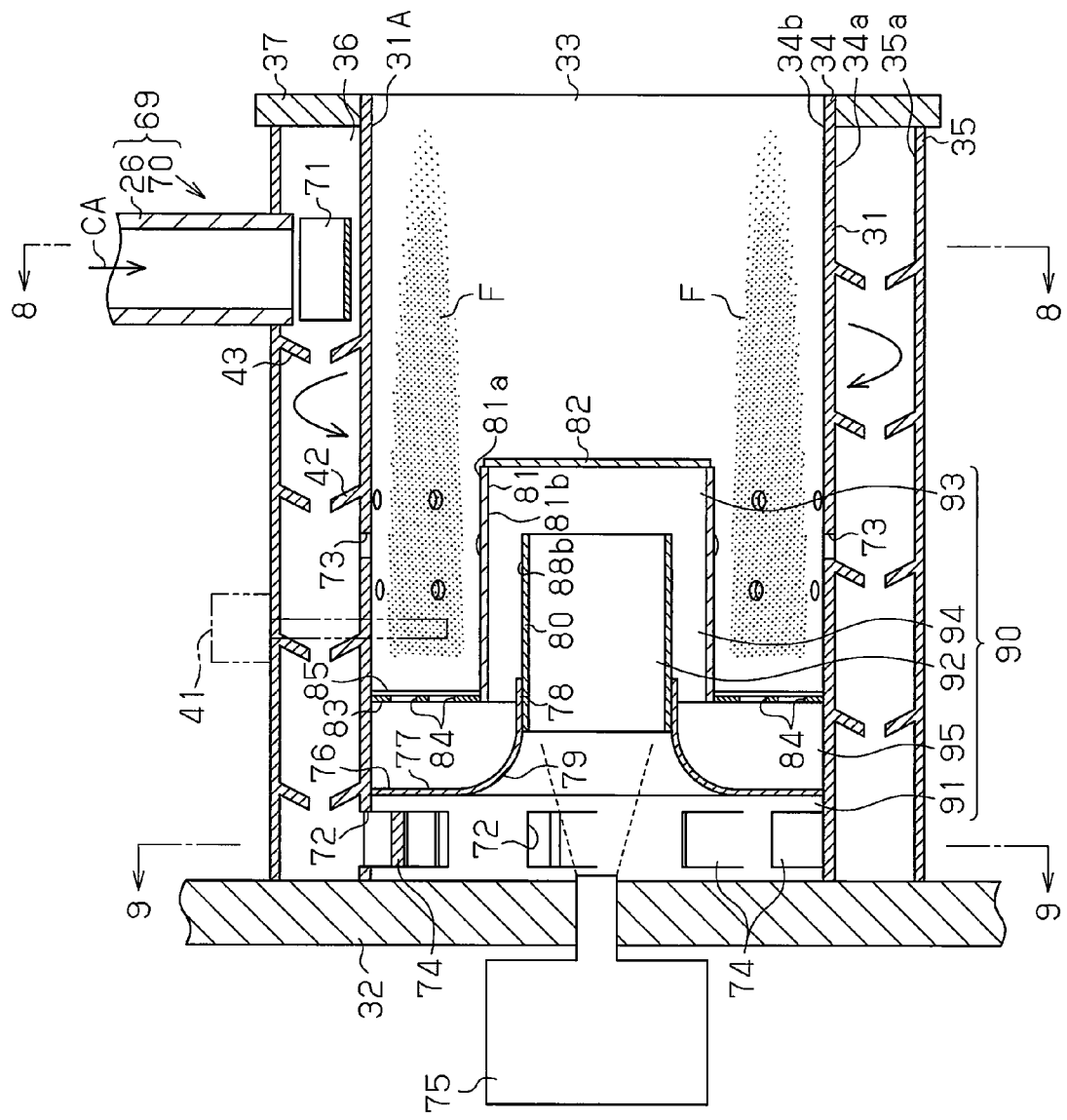
FIG. 7 is a schematic view of a burner according to a third embodiment of the technique of the present disclosure.

As shown in FIG. 7, in a burner 70 including a filter regeneration device 69, the flame stabilizer 31 has a cylindrical tube shape having a bottom and opens toward the DPF 21. The basal wall 32 in the flame stabilizer 31 closes an end of the inner tube 34 in the flame stabilizer 31, and extends outward in the radial direction of the inner tube 34 from the end of the inner tube 34.

The outer tube 35 having a cylindrical tube shape is coupled to an edge of the basal wall 32 in the flame stabilizer 31. The outer tube 35 extends from the edge of the basal wall 32 toward the DPF 21 and substantially surrounds the entire flame stabilizer 31. The one of two tubular ends of the outer tube 35 that is close to the DPF 21 is closed by the annular closing wall 37.

The connection passage 26 is connected to the outer circumferential face of the outer tube 35, and a guide plate 71 is arranged near the outlet of the connection passage 26 on the inner circumferential face of the outer tube 35. The guide plate 71 is positioned to face the outlet of the connection passage 26 and spaced from the connection passage 26. A gap between the outer circumferential face of the inner tube 34 and the outer tube 35 is the introduction flow path 36. Air for combustion CA entering the introduction flow path 36 from the connection passage 26 is guided by the guide plate 71 to flow along the outer circumferential face of the inner tube 34. The inner tube 34 and the outer tube 35 constitute an air supply passage in the burner 70. The inner tube 34 is a heating portion that heats the air for combustion CA flowing through the air supply passage.

The one of two tubular end portions of the inner tube 34 that is close to the basal wall 32 includes a plurality of first communication holes 72 extending through the inner tube 34. The first communication holes 72 are lined up at equal intervals in the circumferential direction of the inner tube 34. The space surrounded by the flame stabilizer 31 includes the combustion area 33. The first communication holes 72 deliver some of the air for combustion CA that has entered the introduction flow path 36 to the inside of the flame stabilizer 31.

The one of the two end portions of the inner tube 34 that is close to the DPF 21 includes a projection port 31A, from which flame F projects. The portion of the inner tube 34 that is located between the first communication holes 72 and the projection port 31A includes a plurality of second communication holes 73 extending through the inner tube 34. The second communication holes 73 are lined up at equal intervals in the circumferential direction of the inner tube 34. The second communication holes 73 deliver the air for combustion CA that has entered the introduction flow path 36 to the inside of the flame stabilizer 31.

A raised piece 74 is formed on each opening edge of the first communication holes 72 by cutting a portion of the circumferential wall of the inner tube 34 and raising the portion. The raised pieces 74 guide the air for combustion CA from the first communication holes 72 to the inside of the flame stabilizer 31 so that the air for combustion CA swirls inside the flame stabilizer 31.

A fuel supply unit 75, which supplies fuel to the inside of the flame stabilizer 31, is fixed to the basal wall 32. The distal portion of the fuel supply unit 75 that includes a supply port is arranged inside the flame stabilizer 31. The fuel supply unit 75 is connected to a fuel pump for supplying fuel to the engine through a fuel valve. When the fuel valve is opened, fuel is sent to the fuel supply unit 75 from the fuel pump. The fuel sent to the fuel supply unit 75 is vaporized in the fuel supply unit 75 and injected to the inside of the flame stabilizer 31.

A coupling portion 76 is coupled to the inner circumferential face 34b of the inner tube 34 between the first communication holes 72 and the second communication holes 73. The coupling portion 76 includes a flange 77, an insertion portion 78, and a radially-narrowed portion 79. The flange 77, the insertion portion 78, and the radially-narrowed portion 79 are integrated.

The annular flange 77 is formed to reside along the inner circumferential face 34b of the inner tube 34 and coupled to the inner circumferential face 34b of the inner tube 34 over the entire circumference of the inner circumferential face 34b. The flange 77 defines the space sandwiched by the flange 77 and the basal wall 32 in the space surrounded by the inner tube 34.

The space between the flange 77 and the basal wall 32 is a first mixing chamber 91. Air for combustion CA enters the first mixing chamber 91 through the first communication holes 72, and fuel enters the first mixing chamber 91 from the fuel supply unit 75. Then, the air for combustion CA swirling around the axis of the flame stabilizer 31 and the fuel injected toward the center of the swirling air for combustion are mixed in the first mixing chamber 91.

The insertion portion 78 has a cylindrical tube shape extending from the radially-narrowed portion 79 toward the projection port 31A and has a smaller inner diameter than the inner diameter of the flange 77. The radially-narrowed portion 79 is a tube, which is shaped like a truncated cone extending from the inner circumferential edge of the flange 77 toward the projection port 31A and couples the flange 77 with the insertion portion 78.

A first inner tube 80 having a cylindrical tube shape is inserted into the insertion portion 78. The insertion portion 78 is connected to the one of two ends of the first inner tube 80 that is close to the basal wall 32. The flange 77 of the coupling portion 76 is coupled to the inner circumferential face 34b of the flame stabilizer 31, and the insertion portion 78 of the coupling portion 76 is coupled to the outer circumferential face 88b of the first inner tube 80. The coupling portion 76 closes the gap between the inner circumferential face 34b of the inner tube 34 and the outer circumferential face 88b of the first inner tube 80. The one of the two ends of the first inner tube 80 that is close to the projection port 31A is opened.

A second inner tube 81 is arranged around the first inner tube 80 to surround the first inner tube 80. The one of the two ends of the first inner tube 80 that is close to the projection port 31A is surrounded by the second inner tube 81 having a cylindrical tube shape. The one of two ends of the second inner tube 81 that is close to the projection port 31A is closer to the projection port 31A than the one of the two ends of the first inner tube 80 that is close to the projection port 31A. The one of the two ends of the second inner tube 81 that is close to the basal wall 32 is closer to the projection port 31A than the one of the two ends of the first inner tube 80 that is close to the basal wall 32.

The one of the two ends of the second inner tube 81 that is close to the projection port 31A is closed by the closing wall 82. The one of the two ends of the second inner tube 81 that is close to the basal wall 32 is fixed to the inner circumferential face 34b of the inner tube 34 by an annular supporting plate 83.

The inner circumferential edge of the supporting plate 83 is entirely coupled to an outer circumferential face 81a of the second inner tube 81. The outer circumferential edge of the supporting plate 83 is entirely coupled to the inner circumferential face 34b of the flame stabilizer 31. A plurality of communication passages 84 extends through the supporting plate 83. The space between the supporting plate 83 and the projection port 31A and the space between the supporting plate 83 and the basal wall 32 are connected through the communication passages 84. A wire mesh 85 for covering the communication passages 84 is attached to the supporting plate 83.

A second mixing chamber 92, which is a space surrounded by the inner circumferential face of the first inner tube 80, is defined in the space surrounded by the flame stabilizer 31. The air-fuel mixture coming out of the first mixing chamber 91 enters the second mixing chamber 92.

A third mixing chamber 93 is defined in the space surrounded by the flame stabilizer 31. The third mixing chamber 93 is a space surrounded by the inner circumferential face 81b of the second inner tube 81 and the closing wall 82 and is located between the second mixing chamber 92 and the projection port 31A. The air-fuel mixture coming out of the second mixing chamber 92 enters the third mixing chamber 93.

A fourth mixing chamber 94, which is a gap between the outer circumferential face 88b of the first inner tube 80 and the inner circumferential face 81b of the second inner tube 81, is defined in the space surrounded by the flame stabilizer 31. The air-fuel mixture coming out of the third mixing chamber 93 enters the fourth mixing chamber 94.

A fifth mixing chamber 95, which is a space surrounded by the inner circumferential face 34b of the inner tube 34, the supporting plate 83, and the coupling portion 76, is defined in the space surrounded by the flame stabilizer 31. The air-fuel mixture coming out of the fourth mixing chamber 94 enters the fifth mixing chamber 95.

A spark plug is fixed to the outer circumferential face of the outer tube 35. The distal end of the ignition unit 41 of the spark plug protrudes into the inner tube 34 from the inner circumferential face 34b of the inner tube 34. The distal end of the ignition unit 41 is positioned in the gap between the inner circumferential face 34b of the inner tube 34 and the outer circumferential face 81a of the second inner tube 81, and positioned between the supporting plate 83 and the projection port 31A.

The first mixing chamber 91, the second mixing chamber 92, the third mixing chamber 93, the fourth mixing chamber 94, and the fifth mixing chamber 95 constitute one premixing chamber 90. The gap between the inner circumferential face 34b of the inner tube 34 and the outer circumferential face 81a of the second inner tube 81 and the space between the closing wall 82 and the projection port 31A constitute a combustion area 33 in the flame stabilizer 31. The premixing chamber 90 and the combustion area 33 are comparted by a partition portion including the second inner tube 81, the closing wall 82, and the supporting plate 83.

The air-fuel mixture produced in the first mixing chamber 91 passes the second mixing chamber 92 and once flows toward the projection port 31A. The air-fuel mixture that has passed the second mixing chamber 92 passes the third mixing chamber 93 and the fourth mixing chamber 94 and returns toward the basal wall 32. As a result, after the air-fuel mixture produced in the first mixing chamber 91 turns back in the axial direction of the flame stabilizer 31, the air-fuel mixture comes out of the fifth mixing chamber 95 to the combustion area 33 and is ignited in the combustion area 33.

For this reason, under the assumption that the premixing chamber 90 has a limited length in the axial direction of the flame stabilizer 31, fuel and air for combustion CA are mixed with a great extent by lengthening the flow path of the air-fuel mixture. In other words, under the assumption that the fuel and the air for combustion CA are mixed with a prescribed extent, the length of the premixing chamber 90 in the axial direction of the flame stabilizer 31 is curbed by turning-back the flow path of the air-fuel mixture.

The passage through which air for combustion CA flows will now be described in detail.

The inner tube 34 includes the plurality of fins 42 on the outer circumferential face 34a. The fins 42 are arranged in a helical manner to rotate around the axis of the inner tube 34. The fins 42 are formed on the outer circumferential face 34a of the inner tube 34 except the portion including the second communication holes 73. The fins 42 are arranged on the substantially entire outer circumferential face 34a from the one of the two ends of the inner tube 34 that is close to the projection port 31A to the other end, which is close to the basal wall 32. The fins 42 are tilted from the outer circumferential face 34a toward the one of the two ends of the inner tube 34 that is close to the basal wall 32.

The fins 43 are formed on the inner circumferential face 35a of the outer tube 35. The fins 43 are arranged in a helical manner to extend around the axis of the outer tube 35. The fins 43 are arranged on the substantially entire inner circumferential face 35a from the one of two ends of the outer tube 35 that is close to the projection port 31A to the other end, which is close to the basal wall 32, and arranged such that the fins 43 face the fins 42. The fins 43 are tilted toward the one of the two ends of the outer tube 35 that is close to the basal wall 32 from the inner circumferential face 35a.

Figure 8:
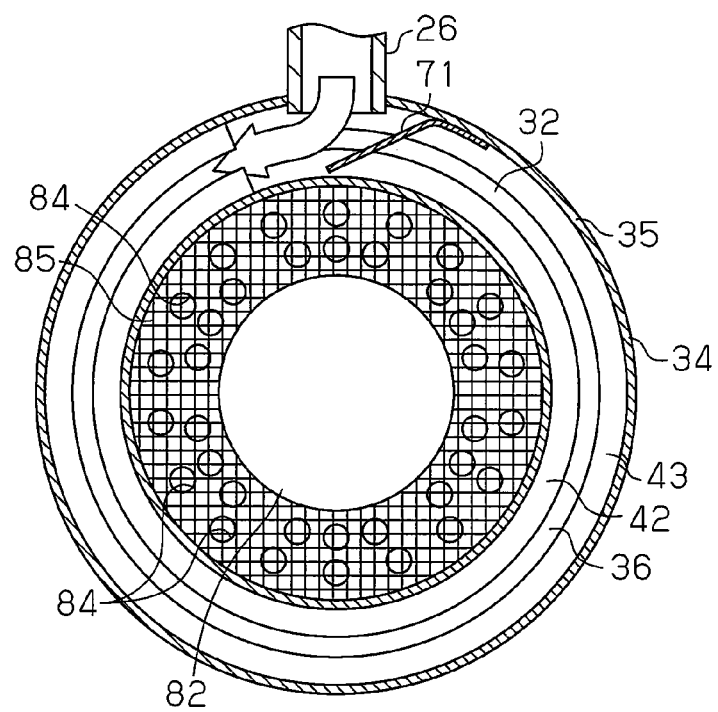
FIG. 8 is a cross-sectional view taken along line 8-8 of FIG. 7.

As shown in FIG. 8, the fins 42 are spaced from the fins 43 to form an annular gap around the axis of the inner tube 34. The air for combustion CA guided from the guide plate 71 to the introduction flow path 36 is guided by the fins 42 and 43 to swirl along the outer circumferential face 34a of the inner tube 34.

When the air for combustion CA swirling along the outer circumferential face 34a receives heat of flame F through the inner tube 34, the temperature of the air for combustion CA is raised higher than the temperature before being introduced to the introduction flow path 36. The air for combustion CA at a temperature raised by the heat of the flame F comes out of the introduction flow path 36 to the inside of the inner tube 34 through the second communication holes 73 and the first communication holes 72. As a result, both the air for combustion CA entering the premixing chamber 90 and the air for combustion CA entering the combustion area 33 are the air for combustion CA at the raised temperature. For this reason, the air-fuel mixture produced in the premixing chamber 90 has the temperature raised. Furthermore, the air for combustion CA has the temperature raised so that combustion in the combustion area 33 is promoted. For this reason, it is possible to further reduce unburned gas in the flame F.

Figure 9:
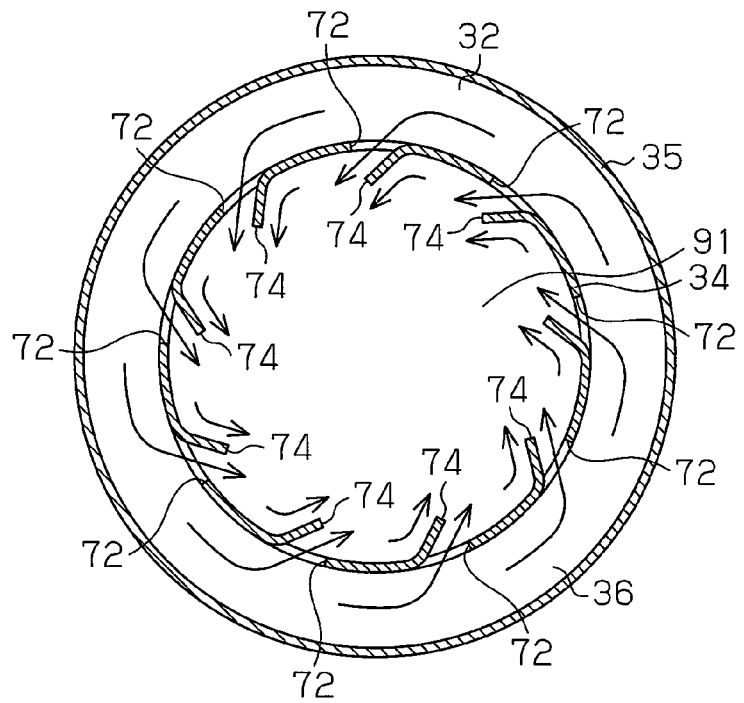
FIG. 9 is a cross-sectional view taken along line 9-9 of FIG. 7.

As shown in FIG. 9, the air for combustion CA entering the first mixing chamber 91 through the first communication holes 72 is guided by the raised pieces 74 to swirl around the axis of the inner tube 34. In this case, the swirling direction of the air for combustion CA in the first premixing chamber 91 is counterclockwise in FIG. 9 and is the same as the swirling direction of the air for combustion CA on the introduction flow path 36. For this reason, compared to the configuration in which the swirling direction of the air for combustion CA in the first premixing chamber 91 is different from the swirling direction of the air for combustion CA on the introduction flow path 36, the decrease in the swirling speed of the air for combustion CA is limited. As a result, it is possible to limit the decrease in the temperature of the air for combustion CA in the premixing chamber 90 after being raised on the introduction flow path 36.

As described above, the filter regeneration device 69 according to the third embodiment provides the following effects (advantages) in addition to the aforementioned effects (1) to (8).

(15) Gas provided to the combustion area 33 is an air-fuel mixture that has been premixed in the premixing chamber 90. For this reason, compared to the configuration in which production of air-fuel mixture and combustion of the air-fuel mixture take place in the combustion area 33, the air-fuel mixture is easily ignited and the efficiency for combusting the air-fuel mixture is increased. This further reduces fuel discharged as unburned gas after being supplied to the combustion area 33.

(16) Air for combustion CA entering the premixing chamber 90 is heated in advance on the introduction flow path 36. For this reason, compared to the configuration in which the air for combustion CA entering the premixing chamber 90 is not heated, the temperature of air-fuel mixture entering the combustion area 33 is raised. As a result, the effect (15) becomes significant.

(17) The fuel supply unit 75 supplies vaporized fuel to the first mixing chamber 91. For this reason, compared to the configuration in which fuel liquid is supplied to the first mixing chamber 91, the temperature of the air-fuel mixture entering the combustion area 33 is raised. As a result, the effect (15) becomes significant.

The first to third embodiments may be modified in the following manner.

In the third embodiment, the partition portion, which comparts the premixing chamber 90 and the combustion area 33, may be, e.g., a flat plate arranged inside the inner tube 34 to be orthogonal to the axis of the inner tube 34. In other words, the partition portion, which comparts the premixing chamber 90 and the combustion area 33, can be employed as long as being a member that partitions the space defined by the inner tube 34 into a space for producing an air-fuel mixture and a space for igniting the air-fuel mixture.

When the partition portion includes the coupling portion 76, the first inner tube 80, the second inner tube 81, the closing wall 82, and the supporting plate 83, a passage that connects the space for producing air-fuel mixture and the space for igniting the air-fuel mixture is complex. For this reason, to promote mixture of fuel and air for combustion, it is preferable for the partition portion to include the coupling portion 76, the first inner tube 80, the second inner tube 81, the closing wall 82, and the supporting plate 83.

In the third embodiment, the second communication holes 73 may be omitted. Specifically, air for combustion CA may be supplied to the combustion area 20 only through the first communication holes 72.

In the third embodiment, the first communication holes 72 may be omitted. In this case, it is configured such that air for combustion CA being introduced to the premixing chamber 90 does not travel around the flame stabilizer 31 and is supplied to the premixing chamber 90, e.g., by connecting passages branched off from the connection passage 26 with the basal wall 32.

The burner 65 according to the second embodiment may be replaced by the burner 30 according to the first embodiment or the burner 70 according to the third embodiment. In this case, the flow path 62 of the outflow passage 55 in the second embodiment corresponds to the flow path 38 of the connection passage 26 in the first and third embodiments. With this configuration, air for combustion is gradually heated with exhaust gas and flame F, and the temperature of the air for combustion introduced to the combustion area 33 is raised higher than the air for combustion in the first to third embodiments. As a result, vaporization of fuel in the air-fuel mixture is further promoted.

As in the second embodiment, when air for combustion is heated with exhaust gas, the exhaust gas for heating the air for combustion is not limited to exhaust gas flowing upstream of the DPF 21, but may be exhaust gas flowing downstream of the DPF 21. With this configuration, in the regeneration process, the air for combustion is heated with the exhaust gas after passing through the DPF 21, which is exhaust gas at the temperature raised by the burner 65. For this reason, compared to when the air for combustion is heated with the exhaust gas upstream of the DPF 21, under the assumption that the same amount of fuel is supplied to the combustion area, the temperature of the exhaust gas flowing into the DPF 21 is raised higher. As a result, it is possible to further reduce the size of the burner 65 while effectively utilizing waste heat of the exhaust gas. In general, a catalyst for purifying exhaust gas is arranged near the DPF 21. For this reason, to limit the decrease in the temperature of the catalyst, it is preferable that heat is transferred between the exhaust gas and the air for combustion downstream of the catalyst.

In the second embodiment, heating of air for combustion with exhaust gas is not limited to the heating that is performed in the double tube portion. The heating may be performed by receiving heat from the wall of the exhaust pipe 18, which forms a flow path through which the air for combustion flows. For this reason, piping for air for combustion may be arranged, e.g., parallel to the exhaust pipe 18 such that a portion of the wall of the piping contacts a portion of the wall of the exhaust pipe 18.

In the second embodiment, when air for combustion is heated with exhaust gas in the double tube portion, the air for combustion may flow through the inner flow path 57, and the exhaust gas may flow through the outer flow path 60. In this case, it is preferable to form fins on the inner circumferential face of the inner pipe 58.

As in the first and third embodiments, when air for combustion is heated by flame F, the piping through which the air for combustion flows may be arranged in the combustion area 33 to be partially exposed to the flame F. In this case, it is preferable that the portion exposed to the flame F is wound in a helical manner, e.g., along the circumferential wall of the flame stabilizer.

In the second embodiment, either the fins 63 of the inner pipe 58 or the fins 64 of the outer pipe 59 may be omitted. Alternatively, both the fins 63 and the fins 64 may be omitted.

In the first and third embodiments, either the fins 42 of the inner tube 34 or the fins 43 of the outer tube 35 may be omitted. Alternatively, both the fins 42 and the fins 43 may be omitted.

In the first embodiment, to facilitate production of a swirling flow of air for combustion on the introduction flow path 36, a guide portion for guiding air for combustion in the circumferential direction of the inner tube 34 may be provided, e.g., in a connection portion between the flow path 38 and the introduction flow path 36. Also, the connection passage 26 may be connected, e.g., to a position that is offset from the axis of the outer tube 35 as viewed on a plane along the axis of the outer tube 35.

In a similar manner, to facilitate production of a swirling flow of air for combustion on the outer flow path 60 in the second embodiment, a guide portion for guiding air for combustion in the circumferential direction of the inner pipe 58 may be provided, e.g., in a connection portion between the flow path 61 and the outer flow path 60. Also, the inflow passage 54 may be connected, e.g., to a position that is offset from the axis of the outer pipe 59 as viewed on a plane along the axis of the outer pipe 59.

In the first and third embodiments, the heating portion of the burner is not limited to the inner tube 34 including the combustion area 33 but may be the inner pipe 58, which is an exhaust passage through which exhaust gas flows, in the same way as the second embodiment. Specifically, the air supply portion 50 in the second embodiment may be included in the air supply passage of the burner in the first and third embodiments.

The heating portion in the first and third embodiments is the inner tube 34 including the combustion area 33, and the heating portion in the second embodiment is the inner pipe 58 defining the inner flow path 57, through which exhaust gas flows. Not limited to those, the heating portion may be a heater or a burner for heating air for combustion. With this heating portion, e.g., even at start of the engine, the temperature of air for combustion is promptly raised. In the filter regeneration device, the air for combustion may be heated with the exhaust gas or flame F, or by the heater or the burner, or the like. Alternatively, the air for combustion may be heated by combination of these if necessary. Also, the heater may be an electric heating type or an induction-heating electric type.

In the second embodiment, the connection position of the outflow passage 55 may be modified as long as the outer flow path 60 includes a space capable of storing condensation occurring in the outer flow path 60. The connection position may be modified according to, e.g., the shape and the orientation of the double tube portion 51.

The fuel injected from the fuel supply unit 40, 75 may be supplied from a common rail, not by a fuel pump. Also, a fuel pump may be provided that supplies fuel only to the fuel supply unit 40, 75.

The ignition unit may include a glow plug, a laser spark device, and a plasma spark device in addition to a spark plug. If being able to produce flame F, one of the glow plug, the laser spark device, and the plasma spark device may be provided.

Not limited to the intake air flowing through the intake pipe 13, air for combustion may be air flowing through piping connected to the air tank of a brake or air supplied by a blower for a filter regeneration device.

The object to be heated that is arranged downstream of the burner is not limited to a filter but may be various types of catalysts used for purifying exhaust gas. Alternatively, the object to be heated arranged downstream of the burner may be both a filter and a catalyst.

The engine including the filter regeneration device may be a gasoline engine.

DESCRIPTION OF THE REFERENCE NUMERALS

TC: turbocharger, 10: diesel engine, 11: cylinder block, 11a: cylinder, 12: intake manifold, 13: intake pipe, 14: air cleaner, 15: compressor, 16: exhaust manifold, 17: EGR pipe, 18: exhaust pipe, 18a, 18b: flange, 19: turbine, 21: diesel particulate filter, 22: filter regeneration device, 26: connection passage, 27: air valve, 30: burner, 31: flame stabilizer, 32: basal wall, 33: combustion area, 34: inner tube, 34a: outer circumferential face, 35: outer tube, 35a: inner circumferential face, 36: introduction flow path, 37: closing wall, 38: flow path, 39: communication hole, 40: fuel supply unit, 41: ignition unit, 42, 43: fin, 45: filter regeneration device, 50: air supply portion, 51: double tube portion, 52, 53: flange, 54: inflow passage, 55: outflow passage, 56: air valve, 57: exhaust flow path, 58: inner pipe, 58a: outer circumferential face, 59: outer pipe, 59a: inner circumferential face, 60: outer flow path, 61, 62: flow path, 63, 64: fin, 65: burner, 66: flame stabilizer, 67: closing plate, 68: introduction portion, 69: filter regeneration device, 70: burner, 71: guide plate, 72: first communication hole, 73: second communication hole, 74: raised pieces, 75: fuel supply unit, 76: coupling portion, 77: flange, 78: insertion portion, 79: radially-narrowed portion, 80: first inner tube, 81: second inner tube, 81a: outer circumferential face, 82: closing wall, 83: supporting plate, 84: communication passage, 85: wire mesh, 90: premixing chamber, 91: first mixing chamber, 92: second mixing chamber, 93: third mixing chamber, 94: fourth mixing chamber, and 95: fifth mixing chamber.

The invention claimed is:

1. A burner arranged in an exhaust passage of an engine, comprising:
   a tubular flame stabilizer;
   a fuel supply unit for supplying fuel to an inside of the flame stabilizer;
   an outer tube;
   wherein at least one of an exhaust passage and the flame stabilizer is located inside the outer tube and coaxial with the outer tube;
   an air supply passage provided between the outer tube and at least one of the exhaust passage and the flame stabilizer, wherein the air supply passage includes a heating portion for heating air with heat received from at least one of the exhaust passage and the flame stabilizer, and the air supply passage is in communication with the inside of the flame stabilizer and operable to supply the air heated by the heating portion to the inside of the flame stabilizer; and
   an ignition unit for igniting air-fuel mixture of the fuel and the air in the flame stabilizer.

2. The burner according to claim 1, wherein
   the air supply passage includes a wall portion, which forms a flow path through which the air flows,
   the heating portion includes the wall portion, and
   the wall portion heats the air with heat received from at least one of the exhaust passage and the flame stabilizer.

3. The burner according to claim 2, wherein the wall portion includes a fin, which contacts the air.

4. The burner according to claim 2, wherein
   the flame stabilizer includes a circumferential wall, which forms a combustion area in which the air-fuel mixture is combusted, and
   the wall portion includes the circumferential wall.

5. The burner according to claim 4, wherein
   the air supply passage includes an outer tube, which surrounds the circumferential wall,
   the circumferential wall includes a communication hole through which the flow path between the outer tube and the circumferential wall communicates with the combustion area, and
   the air supply passage supplies the air introduced to the flow path to the combustion area through the communication hole.

6. The burner according to claim 5, wherein
   the flame stabilizer has a distal end from which the flame projects, and
   the air is introduced to the air supply passage from a portion of the air supply passage that is located closer to the distal end than to the communication hole.

7. The burner according to claim 1, further comprising a premixing chamber, which is arranged in the flame stabilizer and produces the air-fuel mixture, wherein
   the air supply passage supplies the air to the premixing chamber.

8. A filter regeneration device arranged upstream of a filter arranged in an exhaust passage of an engine, comprising:
   a tubular flame stabilizer;
   a fuel supply unit for supplying fuel to an inside of the flame stabilizer;
   an outer tube;
   wherein at least one of an exhaust passage and the flame stabilizer is located inside the outer tube and coaxial with the outer tube;
   an air supply passage provided between the outer tube and at least one of the exhaust passage and the flame stabilizer, wherein the air supply passage includes a heating portion for heating air with heat received from at least one of the exhaust passage and the flame stabilizer, and the air supply passage is in communication with the inside of the flame stabilizer and operable to supply the air heated by the heating portion to the inside of the flame stabilizer; and
   an ignition unit for igniting air-fuel mixture of the fuel and the air in the flame stabilizer.

9. The filter regeneration device according to claim 8, wherein
   the air supply passage includes a wall portion, which forms a flow path through which the air flows,
   the heating portion includes the wall portion, and
   the wall portion heats the air with heat received from at least one of the exhaust passage and the flame stabilizer.

10. The burner according to claim 1, wherein
    the frame stabilizer includes a wall portion,
    wherein at least one of the wall portion and the outer tube comprises a fin that is arranged in a helical manner along at least a portion of a length of the wall portion and the outer tube.

11. The filter regeneration device according to claim 8, wherein
    the frame stabilizer includes a wall portion,
    wherein at least one of the wall portion and the outer tube comprises a fin that is arranged in a helical manner along at least a portion of a length of the wall portion and the outer tube.

* * * * *